United States Patent
Boleskei et al.

(10) Patent No.: US 6,442,214 B1
(45) Date of Patent: Aug. 27, 2002

(54) DIVERSITY TRANSMITTER BASED ON LINEAR TRANSFORM PROCESSING OF TRANSMITTED INFORMATION

(75) Inventors: Helmut Boleskei; Peroor K. Sebastian, both of Mountain View; Shilpa Talwar, Palo Alto; Arogyaswami J. Paulraj, Stanford, all of CA (US)

(73) Assignee: Iospan Wireless, Inc., San Jose, CA (US)

(*) Notice: Subject to any disclaimer, the term of this patent is extended or adjusted under 35 U.S.C. 154(b) by 0 days.

(21) Appl. No.: 09/574,498

(22) Filed: May 19, 2000

(51) Int. Cl.$^7$ ............................................... H04L 27/04
(52) U.S. Cl. ..................... 375/299; 375/260; 375/267; 455/101; 455/103
(58) Field of Search ................................. 375/299, 260, 375/267, 295, 259, 347; 455/59, 101, 103; 370/213, 211

(56) References Cited

U.S. PATENT DOCUMENTS

| | | | | |
|---|---|---|---|---|
| 5,479,448 A | | 12/1995 | Seshadri ..................... | 375/267 |
| 5,636,246 A | * | 6/1997 | Tzannes et al. ............. | 375/260 |
| 5,815,488 A | | 9/1998 | Williams et al. ............ | 370/208 |
| 5,822,372 A | * | 10/1998 | Emami ........................ | 375/260 |
| 5,862,092 A | | 1/1999 | Huszar et al. .............. | 375/347 |
| 5,933,421 A | | 8/1999 | Alamouti et al. .......... | 370/330 |
| 6,064,662 A | | 5/2000 | Gitlin et al. ................ | 370/330 |
| 6,144,711 A | | 11/2000 | Raleigh et al. ............. | 375/347 |
| 6,198,775 B1 | | 3/2001 | Khayrallah et al. ........ | 375/265 |
| 6,185,258 B1 | * | 6/2001 | Alamouti et al. ........... | 375/260 |

FOREIGN PATENT DOCUMENTS

| WO | WO98/09381 | 5/1998 | ............ | H04B/1/38 |
|---|---|---|---|---|
| WO | WO99/14871 | 3/1999 | ............ | H04B/7/06 |

OTHER PUBLICATIONS

Bolcskei, H.; Paulraj, A.J. "Space–frequency coded broad-band OFDM systems" Wireless Communications and Networking Conference, 2000, WCNC. 2000 IEEE, vol. 1, 2000 pp 1–6.*

(List continued on next page.)

Primary Examiner—Stephen Chin
Assistant Examiner—Shuwang Liu
(74) Attorney, Agent, or Firm—Brian R. Short

(57) ABSTRACT

The present invention provides a diversity transmission system. The diversity transmission system includes a diversity transmitter receiving incoming symbols. The diversity transmitter includes at least one transmitter antenna transmitting a plurality of multi-carrier modulated signals. Each multi-carrier-modulated signal includes a corresponding processed symbol sub-block stream. Each symbol of the processed symbol sub-block stream is based on a linear transform of a plurality of incoming symbols. The diversity transmission system further includes a diversity receiver. The diversity receiver includes at least one receiver antenna receiving the plurality of multi-carrier modulated signals after the multi-carrier modulated signals having been modified by transmission channels between the transmitter antennas and the receiver antenna. The diversity receiver further includes at least one multi-carrier demodulator for demodulating the received multi-carrier modulated signals and generating a demodulated symbol stream. A symbol-processing unit receives the demodulated symbol stream and generates a stream of outgoing symbols. The invention also includes a diversity transmitter. The diversity transmitter includes a symbol-processing unit for receiving a stream of incoming symbols and generating a plurality of processed symbol streams. The processed symbol streams are based on linear transforms of the incoming symbols. A plurality of multi-carrier modulators generate a plurality of multiple-carrier modulated signals. Each multi-carrier modulator receives a corresponding processed symbol stream and generates a multiple-carrier-modulated signal based on the corresponding processed symbol stream.

4 Claims, 8 Drawing Sheets

OTHER PUBLICATIONS

Lee, K.F.; Williams, D.B. "A Space–Frequency transmitter diversity technique for OFDM systems" Global Telecommunications Conf., 2000. GLOBECOM '00. IEEE, vol. 3, 2000 pp 1473–1477.*

Paulraj, A., *Taxonomy of space–time processing for wireless networks,* IEE Proc—Radar Sonar Navig., vol. 145, No. 1, Feb. 1998.

* cited by examiner

DIVERSITY TRANSMITTER BASED ON LINEAR TRANSFORM PROCESSING OF TRANSMITTED INFORMATION

FIELD OF THE INVENTION

The invention relates generally to wireless communications. More particularly, the invention relates to generating multiple processed symbol streams from a single incoming symbol stream to provide transmission diversity through multiple transmitters, receiving the multiple transmitted processed symbol streams and extracting the original single incoming symbol stream.

BACKGROUND OF THE INVENTION

Wireless communication systems commonly include information carrying modulated carrier signals that are wirelessly transmitted from a transmission source to one or more receivers within an area or region. FIG. 1 shows modulated carrier signals traveling from a transmitter 110 to a receiver 120 following many different (multiple) transmission paths.

Multipath is the composition of a primary signal plus duplicate or echoed images caused by reflections of signals off objects between the transmitter and receiver. The receiver may receive the primary signal sent by the transmitter, but also receives secondary signals that are reflected off objects located in the signal path. The reflected signals arrive at the receiver later than the primary signal. Due to this misalignment, the multipath signals can cause intersymbol interference or distortion of the received signal.

The actual received signal is a combination of a primary and several reflected signals. Because the distance traveled by the original signal is shorter than the reflected signals, the signals are received at different times. The time difference between the first received and the last received signal is called the delay spread and can be as great as several microseconds.

The multiple paths traveled by the modulated carrier signal typically results in fading of the modulated carrier signal. Fading causes the modulated carrier signal to attenuate in amplitude when multiple paths subtractively combine.

In line-of-sight (LOS) wireless systems, multipath is usually minor and the effects can be minimized. The amplitudes of the reflected signals are generally much smaller than the primary signal and can be effectively filtered out using standard techniques. However, in non-line-of-sight (NLOS) wireless systems, the reflected signals may have greater relative power levels because the primary signal may be partially or totally obstructed, and typically more multipath is present.

Transmitter diversity is a technique used in multiple antenna-based communication system to reduce the effects of multi-path fading. Transmitter diversity can be obtained by providing a transmitter with two or more (N) antennas. These N antennas imply N channels that suffer from fading in a statistically independent manner. Therefore, when one channel is fading due to the destructive effects of multi-path interference, another of the channels is unlikely to be suffering from fading simultaneously. By virtue of the redundancy provided by these independent channels, a receiver can often reduce the detrimental effects of fading.

While prior art transmitter diversity systems mitigate the effects of fading, prior art transmitter diversity systems are generally susceptible to narrow band frequency interference. Additionally, many prior art transmitter diversity systems require channel knowledge at the transmitter.

It is desirable to have an apparatus and method that provides a diversity transmitter system for wirelessly transmitting information that results in minimal loss of the transmitted information due to fading and multipath. It is desirable that the transmitter diversity system spreads information in time/frequency/space dimensions, and be immune to narrow band frequency interference. Additionally, it is desirable that the transmitter diversity system easily allows for additional coding redundancy.

SUMMARY OF THE INVENTION

The invention includes an apparatus and a method for generating a plurality of processed transmission symbol streams based on an incoming symbol stream, and transmitting the processed transmission symbol streams over a plurality of transmitters. The invention further includes receiving the processed transmission symbol streams, and extracting the original pre-transmission symbol stream. The processing mitigates the effects of fading and multi-path. The processing also provides spreading of information in frequency and space, and includes immunity to narrow band frequency interference.

A first embodiment of the invention includes a diversity transmission system. The diversity transmission system includes a diversity transmitter receiving incoming symbols. The diversity transmitter includes at least one transmitter antenna transmitting a plurality of multi-carrier modulated signals. Each multi-carrier-modulated signal includes a corresponding processed symbol sub-block stream. Each symbol of the processed symbol sub-block stream is based on a linear transform of a plurality of incoming symbols. The diversity transmission system further includes a diversity receiver. The diversity receiver includes at least one receiver antenna receiving the plurality of multi-carrier modulated signals after the multi-carrier modulated signals having been modified by transmission channels between the transmitter antennas and the receiver antenna. The diversity receiver further includes at least one multi-carrier demodulator for demodulating the received multi-carrier modulated signals and generating a demodulated symbol stream. A symbol-processing unit receives the demodulated symbol stream and generates a stream of outgoing symbols.

A second embodiment of the invention includes a diversity transmitter. The diversity transmitter includes a symbol-processing unit for receiving a stream of incoming symbols and generating a plurality of processed symbol streams. The processed symbol streams are based on linear transforms of the incoming symbols. A plurality of multi-carrier modulators generate a plurality of multiple-carrier modulated signals. Each multi-carrier modulator receives a corresponding processed symbol stream and generates a multi-carrier-modulated signal based on the corresponding processed symbol stream.

A third embodiment is similar to the second embodiment. The third embodiment includes at least two distinct channels that are formed by a plurality of antennas within an antenna array.

A fourth embodiment is also similar to the second embodiment. The fourth embodiment includes at least two distinct channels that are formed by a plurality of antennas having different polarization states.

A fifth embodiment is also similar to the second embodiment. The fifth embodiment includes at least two distinct channels that are formed by a plurality of separately located transmitters.

A sixth embodiment is similar to the second embodiment. The sixth embodiment further includes the processed streams being generated by multiplying blocks of the incoming symbols with pre-stored linear transform matrices.

A seventh embodiment includes a diversity receiver. The diversity receiver includes at least one receiver antenna receiving a plurality of multi-carrier modulated signals. Each carrier signal of each multi-carrier-modulated signal is modulated by a processed symbol that includes a linear transform of a plurality of incoming symbols to a transmitter. The diversity receiver further includes at least one multi-carrier demodulator for receiving and demodulating the transmission channel modified multi-carrier modulated signals and generating a demodulated symbol stream. A symbol-processing unit receives the demodulated symbol stream and generates a stream of outgoing symbols.

An eighth embodiment includes a method of diversity transmitting. The method includes receiving a stream of incoming symbols and generating a plurality of processed symbol streams. The processed symbol streams are based on linear transforms of the incoming symbols. The method further includes generating a plurality of multiple-carrier modulated signals. Each multiple-carrier-modulated signal is based on a corresponding processed symbol stream.

Other aspects and advantages of the present invention will become apparent from the following detailed description, taken in conjunction with the accompanying drawings, illustrating by way of example the principles of the invention.

DETAILED DESCRIPTION

Figure 1:
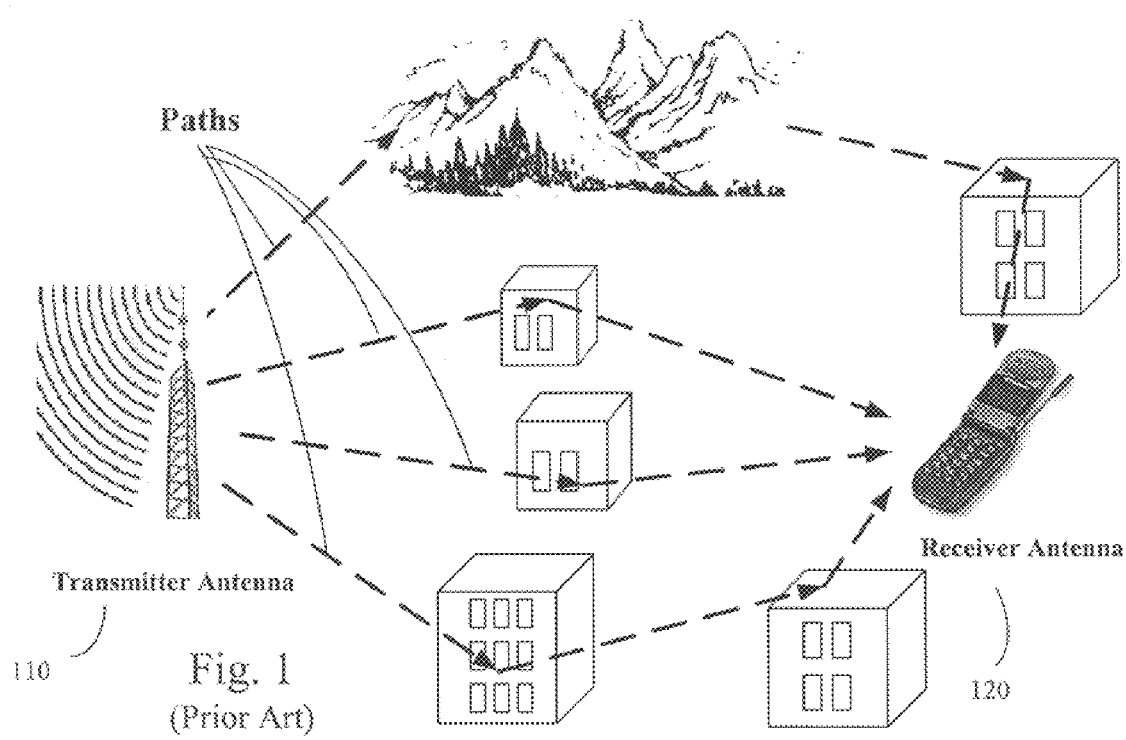
FIG. 1 shows a prior art wireless system that includes multiple paths from a system transmitter to a system receiver.

As shown in the drawings for purposes of illustration, the invention is embodied in an apparatus and a method for generating a plurality of processed transmission symbol streams based on an incoming symbol stream, and transmitting the processed transmission symbol streams over a plurality of transmitters. The invention further includes receiving the processed transmission symbol streams, and extracting the original pre-transmission symbol stream. The processing mitigates the effects of fading and multi-path. The processing also provides spreading of information in frequency and space, and includes immunity to narrow band frequency interference.

Figure 2:
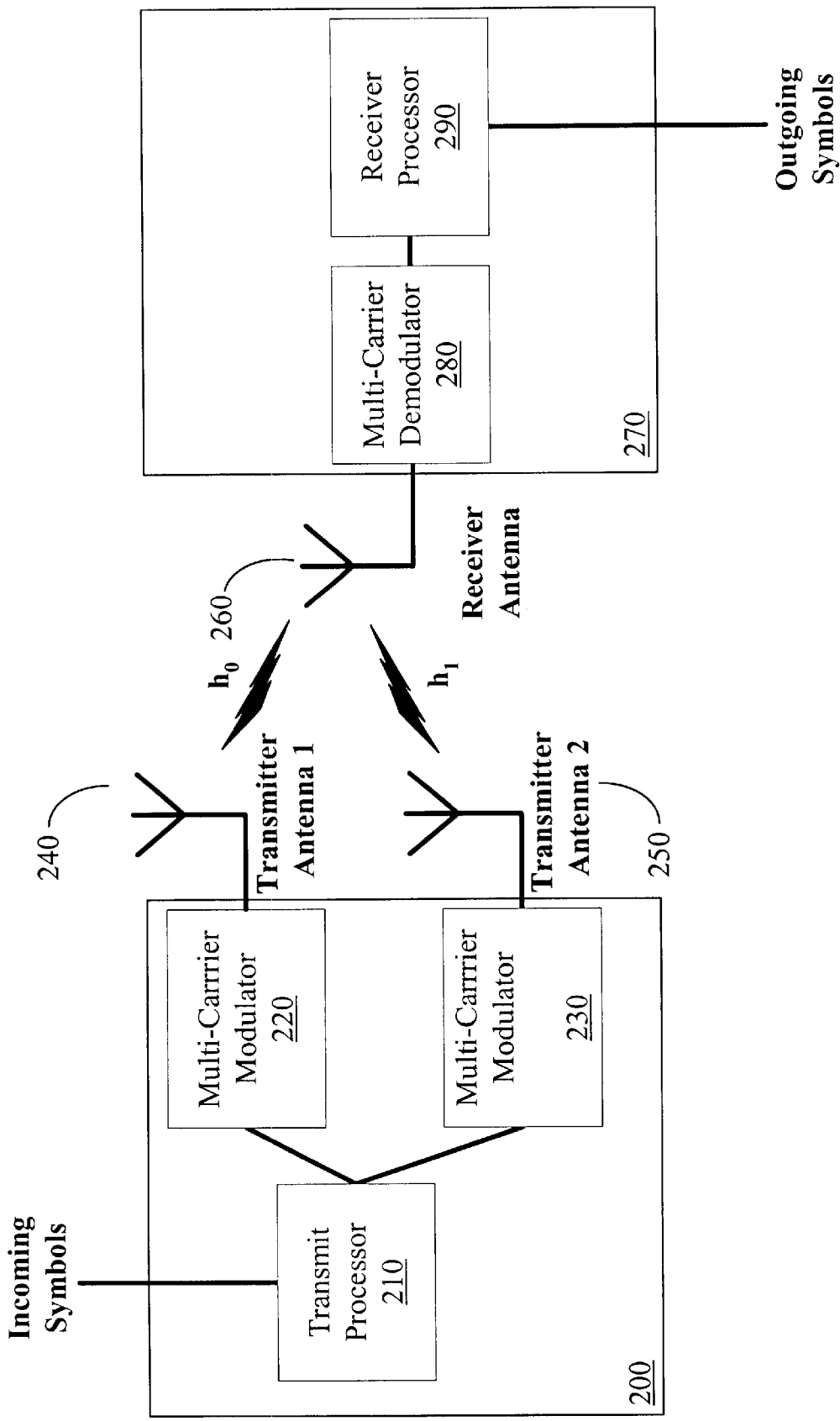
FIG. 2 shows an embodiment of the invention.

FIG. 2 shows an embodiment of the invention. This embodiment includes a diversity transmitter 200 and diversity receiver 270.

The diversity transmitter 200 includes a symbol-processing transmitter unit 210 and multiple carrier modulators 220, 230.

The symbol-processing transmitter unit 210 receives a stream of incoming symbols and generates a plurality of processed symbol streams. Generally, each processed symbol stream includes complex processed symbols in which each processed symbol includes a linear transformation of a plurality of the incoming symbols. It should be understood that each processed symbol spans a larger constellation than the constellation of the original incoming symbols.

The transmission of the linear transforms of the incoming symbols over a plurality of processed symbols provides spreading of information in frequency and space, which will be described in more detail later.

A first multi-carrier modulator 220 and a second multi-carrier modulator 230 each generate a plurality of multiple-carrier modulated signals. Each multi-carrier modulator 220, 230 receives a corresponding processed symbol stream and generates a multiple-carrier-modulated signal based on the corresponding processed symbol stream. These modulation systems include baseband modulators and frequency up-conversions to radio frequencies (RF) as is well known in the art of communication systems.

The multi-carrier signals include many (multiple) sub-carrier signals. An embodiment of the invention includes each sub-carrier signal being modulated by a corresponding processed symbol of a corresponding one of the processed symbol streams.

An output of the first multi-carrier modulator 220 is connected to a first transmit antenna 240. An output of the second multi-carrier modulator 230 is connected to a second transmit antenna 250. The first transmit antenna 240 and the second transmit antenna 250 can be located within an antenna area at a single base station, or the first transmit antenna 240 and the second transmit antenna 250 can each be located at a separate base station. Alternatively, the first transmit antenna 240 and the second transmit antenna 250 can have different polarization states, and be either physically co-located at a single base station, or each located at separate base stations. Circuitry associated with the transmit chains can be separately located with the antennas 240, 250.

The embodiment of FIG. 2 only includes two transmit antennas. It is to be understood that the invention can include more than two transmit antennas. The additional antennas can be driven by additional multi-carrier modulators that each include separate corresponding symbol sub-block streams.

This embodiment also includes the diversity receiver 270. The diversity receiver 270 receives the transmitted multiple-carrier modulated signals through a receiver antenna 260. The diversity receiver 270 includes a multi-carrier demodulator 280 and symbol-processing receiver unit 290. The embodiment shown in FIG. 2 includes a single receiver antenna 260. However, the invention can also include multiple receiver antennas and multiple diversity receivers. The invention also includes each diversity receiver including receiver diversity processing that corresponds with the processing of the diversity transmitters of the invention. Additionally, the diversity receiver can be combined with other diversity receivers that include other diversity schemes.

The multi-carrier demodulator 280 demodulates the multiple-carrier-modulated signals that have been received by the diversity receiver 270. As previously described, each sub-carrier signal is modulated by a corresponding processed symbol of a corresponding processed symbol stream.

The receiver processor 290 receives the demodulated output from the multi-carrier demodulator 280, performs symbol processing that corresponds with the processing of the symbol-processing transmitter unit 210. The receiver processor 290 also includes channel state information as will be described later.

Diversity Transmitter

Figure 3:
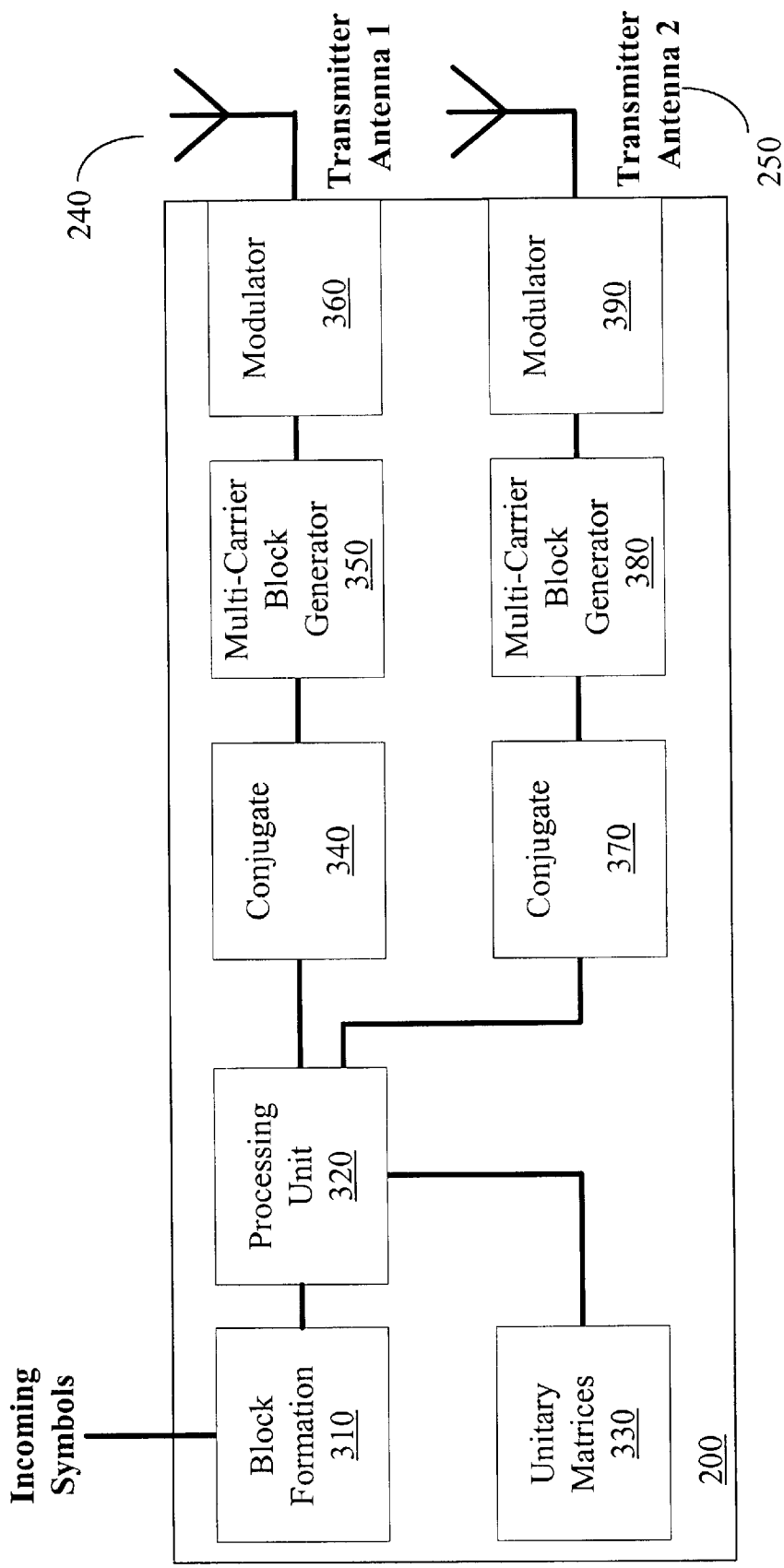
FIG. 3 shows an embodiment of a transmitter according to the invention.

FIG. 3 shows an embodiment of the diversity transmitter 200 according to the invention. The diversity antenna of this embodiment includes a block former 310, a processing unit 320, pre-stored linear transform matrices 330, conjugators 340, 370, multi-carrier block generators 350, 380, and multi-carrier modulators 360, 390. The embodiment of FIG. 3 shows a functional implementation of the invention. However, other implementations that include the basic functionality and methods of the invention can also be used.

The block former 310 groups input symbols into sub-blocks. For example, the block former can group input symbols into sub-blocks of two or four symbols. The number of symbols included within a sub-block is designated as Q in later discussions. For the purposes of discussion, Q is an even number.

The processing unit 320 multiplies the symbols within the sub-blocks created by the block former 310 with matrices stored in the pre-stored linear transform matrices block 330. The sub-blocks are generally grouped as Q×1 matrices. The linear transform matrices are generally N×Q matrices. The resulting outputs are N×1. It should be understood that the sub-blocks can also be grouped as 1×Q matrices, and the linear transform matrices stored as Q×N matrices.

An example includes the block former forming a sub-block of $[s_0\ s_1]^T$, where Q=2. The symbols $s_0$ $s_1$ are two consecutive symbols within the incoming symbol stream. A corresponding set of linear matrices includes:

$$U = \begin{bmatrix} a1 & b1 \\ a2 & b2 \end{bmatrix} \qquad V = \begin{bmatrix} e1 & f1 \\ e2 & f2 \end{bmatrix}$$

A corresponding series of processed symbols includes a first set of processed symbols $(a1^*s_0+b1^*s_1)$, $(a2^*s_0+b2^*s_1)$, and a second set of processed symbols $(e1^*s_0+f1^*s_1)$, $(e2^*s_0+f2^*s_1)$. The entries within the two linear transform matrices (a1, b1, a2, b2, e1, f1, e2 and f2) are real or complex constants. As previously stated, $s_0$ and $s_1$ are generally complex values.

The number of linear matrices stored within the pre-stored linear matrices block 330 is dependent on the number of processed symbol sub-block streams to be generated by the symbol-processing unit 210.

The number of columns within the linear transform matrices is dependent on the number of symbols within the sub-blocks created by the block former 310. The number of columns within the linear matrices can be increased to increase the number of incoming symbols that are included within the linear combination of incoming symbols of each symbol of the processed symbol sub-blocks streams. For example, if the number (Q) of symbols within the sub-blocks is two, then each symbol of the processed symbol sub-blocks streams includes a linear combination of two of the incoming symbols. If the number (Q) of symbols within the sub-blocks is four, then each symbol of the processed symbol sub-blocks streams includes a linear combination of four of the incoming symbols.

The number of rows within the linear transform matrices is adjustable. Generally, increasing the number of rows within the linear transform matrices spreads the incoming symbols over more symbols of each of the processed symbol sub-blocks streams. For example, if the linear transform matrices include four rows, then four consecutive symbols of each processed symbol sub-block stream will include a linear combination of the same number Q of incoming symbols. If the linear transform matrices include six rows, then six consecutive symbols of each processed symbol sub-block stream will include a linear combination of the same number Q incoming symbols. Increasing the number of consecutive symbols of each processed symbol sub-block stream that include a linear combination of Q incoming symbols introduces redundancy into the diversity transmitter 200 and diversity receiver 270 combination.

The conjugation blocks 340, 370 conjugate every second entry of processed sub-blocks within the output streams of the processing unit 320. The incoming symbols and the symbols output from the processing unit, are complex values that can be conjugated. Conjugation along with the linear transformation is a method to diagonalize the channel irrespectively of the channel realization as will be described later.

The multi-carrier block generators 350, 380 receive the conjugated symbols from the conjugation blocks 340, 370. Each of the multi-carrier block generators 350, 380 generate corresponding symbol blocks.

The multi-carrier modulators 360, 390 receive outputs from the multi-carrier block generators 350, 380, and modulate carrier signals with the multi-carrier block generators 350, 380 outputs.

The multi-carrier block generators 350, 380 and the multi-carrier modulators 360, 390 together provide multi-carrier modulated signals in which each carrier of signal of the multi-carrier-modulated signals is modulated by a processed symbol. Prior art systems that include the functionality of the combination of the multi-carrier block generators 350, 380 and the multi-carrier modulators 360, 390 includes orthogonal frequency division multiplexing (OFDM) modulation systems.

Orthogonal Frequency Division Multiplexing (OFDM) Modulation

Frequency division multiplexing systems include dividing the available frequency bandwidth into multiple data carriers. OFDM systems include multiple carriers (or tones) that divide transmitted data across the available frequency spectrum. In OFDM systems, each tone is considered to be orthogonal (independent or unrelated) to the adjacent tones. OFDM systems use bursts of data, each burst of a duration of time that is much greater than the delay spread to minimize the effect of ISI caused by delay spread. Data is transmitted in bursts, and each burst consists of a cyclic prefix followed by data symbols, and/or data symbols followed by a cyclic suffix.

Figure 4:
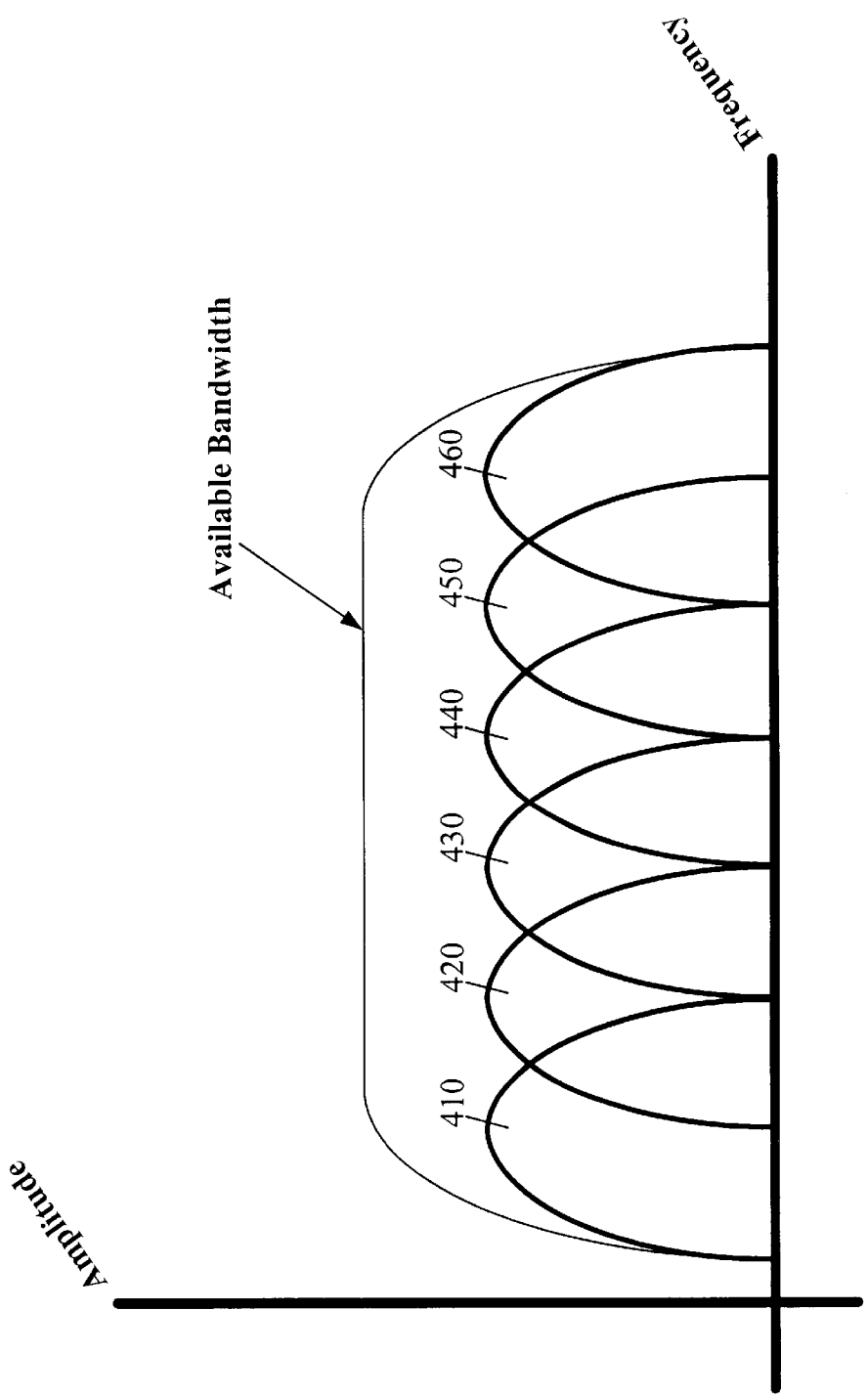
FIG. 4 shows a frequency spectrum of orthogonal frequency division multiplexing (OFDM) sub-carrier signals.

FIG. 4 shows a frequency spectrum of OFDM sub-carrier signals 410, 420, 430, 440, 450, 460. Each sub-carrier 410, 420, 430, 440, 450, 460 is modulated by a separate linear combination of incoming symbols.

An example OFDM signal occupying 6 MHz is made up of 1024 individual carriers (or tones), each carrying a single QAM symbol per burst. A cyclic prefix or cyclic suffix is used to absorb transients from previous bursts caused by multipath signals. Additionally, the cyclic prefix or cyclic suffix causes the symbol stream to look periodic. Additional symbols (for example 100) are transmitted for the cyclic prefix or cyclic suffix. For each symbol period a total of 1124 symbols are transmitted, by only 1024 unique QAM symbols per burst. In general, by the time the cyclic prefix is over, the resulting waveform created by the combining multipath signals is not a function of any samples from the previous burst. Therefore, no ISI occurs. The cyclic prefix must be greater than the delay spread of the multipath signals.

Figure 5:
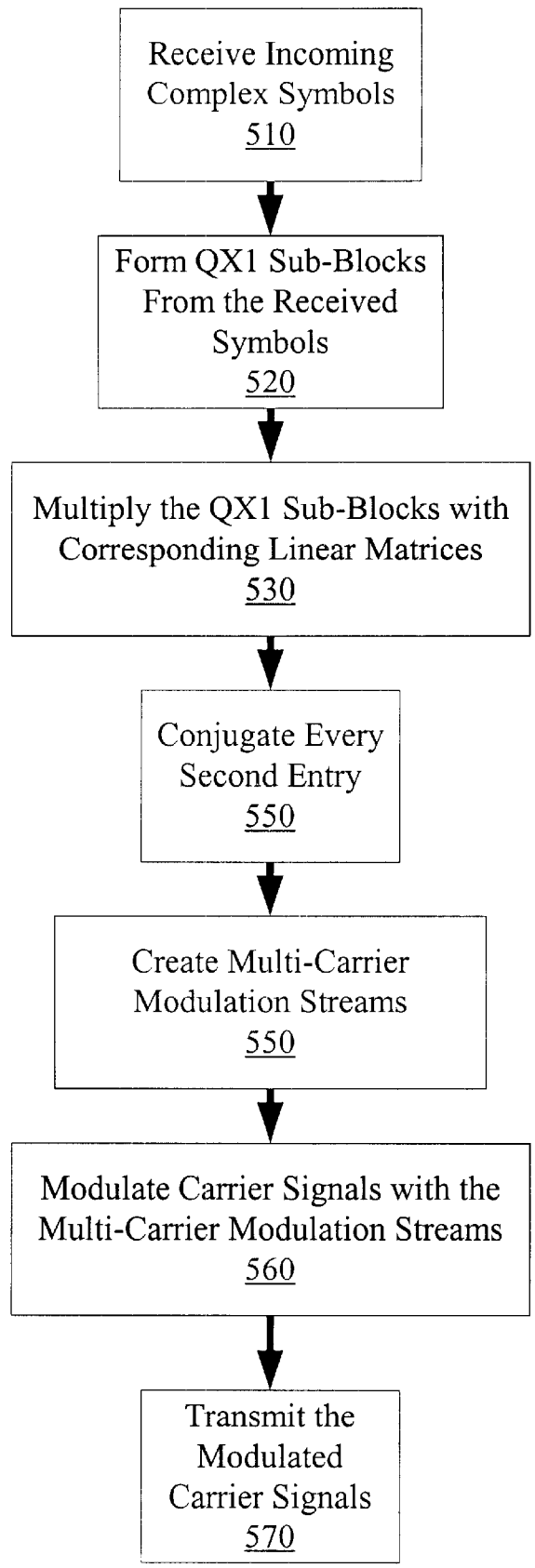
FIG. 5 shows an embodiment of a method of processing incoming symbols and modulating sub-carrier signals before transmission.

FIG. 5 shows an embodiment of a method of processing incoming symbols and modulating sub-carrier signals before transmission.

A first step 510 includes receiving the incoming complex symbols. The symbols can be any one of various digital formats. For example, the incoming complex symbols can be 4 QAM, 16 QAM or 64 QAM.

A second step 520 includes forming Q×1 sub-blocks from the incoming symbols. As previously stated, Q is generally an even number.

A third step 530 includes multiplying the Q×1 sub-blocks with corresponding Q×Q linear matrices generating multiple symbol streams. The Q×Q linear matrices are stored within pre-stored matrix blocks.

A fourth step 540 includes conjugating every second term of the multiplied symbol blocks of each stream.

A fifth step 550 includes creating multiple carrier modulation streams from the conjugated post multiplied symbol blocks.

A sixth step 560 includes modulating a plurality of same frequency carrier signals with the multiple carrier modulation streams.

A seventh step 570 includes transmitting the modulated multi-carrier signals.

Generation of the Linear Transform Matrices

Before discussing the generation of the linear transform matrices, a physical and mathematical discussion of wireless channels is provided. Generally, wireless communication channels are characterized by multi-path, where each path has associated fading and propagation delay. Multipath may be created by reflections in the physical radio path.

At any given time, a signal sent by a transmitter antenna experiences interference effects of the traversed channel. The channel can be modeled by a complex multiplicative distortion factor composed of a magnitude response and phase response. A channel gain from a first transmitter antenna to a first receiver antenna can be denoted $h_0$, and a channel gain from a second transmitter antenna to the first receiver antenna can be denoted $h_1$.

For multi-carrier modulation systems in which many tones are transmitted within a channel, the channel gain is more accurately represented as $h_0^k$ and $h_1^k$ where k varies from 1 to the number of multi-carrier signals K. In the above OFDM example, K=1024.

The tones within the channel of an OFDM signal are closely spaced in the frequency domain. Given the close spacing, an assumption can be made that the channel gains $h_0^k$, $h_1^k$ are constant over Q consecutive tones (sub-carriers). This assumption suggests that the channel frequency response is constant for the Q consecutive tones. With this assumption, the channel gain notation can be simplified to $h_0 = h_0^k$, and $h_1 = h_1^k$. As Q is increased, more tones are included in the transmission of an incoming symbol and the assumption becomes less correct. Generally, Q should be limited to 2, 4 or 8. The actual system performance as a function of Q can be assessed through simulation.

The processing of the system of the invention is now analyzed to aid in the discussion of how to generate the linear transform matrices.

The sub-block formation begins by stacking or grouping Q incoming symbols $s_i$ (i=0, 1, ..., Q−1) into a Q×1 vector according to $s=[s_0\ s_1\ \ldots\ s_{Q-1}]^T$, where $^T$ indicates the transpose of the matrix.

For the case where N=Q, two complex linear transform matrices are defined by Q×Q (complex) matrices U and V with column vectors $u_i$ and $v_i$. Initially, the linear matrices are assumed to be arbitrary. However, the unitarity of U and V and an important relationship between U and V will be derived later. Within the transmitter, the sub-blocks are multiplied by the linear transform matrices to form transmission vectors prior to conjugation. The multiplication of the linear transform matrices U and V, with the sub-blocks results in the transmission vectors of $w_1=U^H s$ and $w_2=V^H s$, where $^H$ indicates the hermitian transpose of the matrix. A hermitian transpose includes a transpose and elementwise conjugation. The next step within the transmitter includes conjugating every second entry within $w_1$ and $w_2$, respectively.

This yields the transmit vectors:

$$t_0 = \begin{bmatrix} u_1^H s \\ u_2^T s^* \\ u_3^H s \\ \vdots \\ u_Q^T s^* \end{bmatrix} \quad t_1 = \begin{bmatrix} v_1^H s \\ v_2^T s^* \\ v_3^H s \\ \vdots \\ v_Q^T s^* \end{bmatrix} \quad (A)$$

The vector $t_0$ is transmitted from the first antenna, and the vector $t_1$ is transmitted from the second antenna. As has been described, the transmitted signals pass through the channels $h_0$, $h_1$, and sum at the receiver. The received signals are demodulated, and blocks of demodulated symbols are formed. It should be understood that synchronization, burst capture and other requisite receiver techniques are well understood in the art of communication system. Stacking the received data samples $r_i$ into a Q×1 vector $r=[r_0\ r_1\ \ldots\ r_{Q-1}]^T$, we obtain:

$$r = \begin{bmatrix} h^T \begin{bmatrix} u_1^H s \\ v_1^H s \end{bmatrix} \\ h^T \begin{bmatrix} u_2^T s^* \\ v_2^T s^* \end{bmatrix} \\ h^T \begin{bmatrix} u_3^H s \\ v_3^H s \end{bmatrix} \\ \vdots \\ h^T \begin{bmatrix} u_Q^T s^* \\ v_Q^H s^* \end{bmatrix} \end{bmatrix} \quad (B)$$

where $h=[h_0\ h_1]^T$. We then conjugate every second entry in the received vector to obtain r'. At the receiver, r'=Hs+n, where H is defined as the induced channel matrix and n is the noise vector. However, for the discussions, the noise vector n is neglected for convenience. Therefore, r'=Hs. Solving for H yields:

$$H = \begin{bmatrix} h^T \begin{bmatrix} u_1^H \\ v_1^H \end{bmatrix} \\ h^H \begin{bmatrix} u_2^H \\ v_2^H \end{bmatrix} \\ \vdots \\ h^H \begin{bmatrix} u_Q^H \\ v_Q^H \end{bmatrix} \end{bmatrix} \quad (C)$$

In order to avoid noise enhancements in the receiver, make the decoding simple, and get the full diversity gain, the Q×Q channel matrix H should be orthogonal. The benefits of making an induced channel matrix orthogonal are well-understood principles in communications theory. Therefore, H should satisfy the following condition:

$$HH^H = H^H H = (|h_0|^2 + |h_1|^2) I_Q,$$

where $I_Q$ is an identity matrix of Q×Q dimensions. Next, the U and V matrices are derived such that the above condition is satisfied.

Therefore, $$HH^H = \begin{bmatrix} h^T \begin{bmatrix} <u_1,u_1> & <v_1,u_1> \\ <u_1,v_1> & <v_1,v_1> \end{bmatrix} h^* & h^T \begin{bmatrix} <u_2,u_1> & <v_2,u_1> \\ <u_2,v_1> & <v_2,v_1> \end{bmatrix} h & \cdots & h^T \begin{bmatrix} <u_Q,u_1> & <v_Q,u_1> \\ <u_Q,v_1> & <v_Q,v_1> \end{bmatrix} h \\ h^H \begin{bmatrix} <u_1,u_2> & <v_1,u_2> \\ <u_1,v_2> & <v_1,v_2> \end{bmatrix} h^* & h^H \begin{bmatrix} <u_2,u_2> & <v_2,u_2> \\ <u_2,v_2> & <v_2,v_2> \end{bmatrix} h & \cdots & h^H \begin{bmatrix} <u_Q,u_2> & <v_Q,u_2> \\ <u_Q,v_2> & <v_Q,v_2> \end{bmatrix} h \\ \vdots & \vdots & & \vdots \\ h^H \begin{bmatrix} <u_1,u_Q> & <v_1,u_Q> \\ <u_1,v_Q> & <v_1,v_Q> \end{bmatrix} h^* & h^H \begin{bmatrix} <u_2,u_Q> & <v_2,u_Q> \\ <u_2,v_Q> & <v_2,v_Q> \end{bmatrix} h & \cdots & h^H \begin{bmatrix} <u_Q,u_Q> & <v_Q,u_Q> \\ <u_Q,v_Q> & <v_Q,v_Q> \end{bmatrix} h \end{bmatrix}$$

(D)

where h* is the element-wise conjugation of h.

The orthogonality of H is satisfied if:

$<u_i,u_l> = \delta[i-l], i=0,1,\ldots,Q-1, l=0,1,\ldots,Q-1$ $<v_i,v_l> = \delta[i-l], i=0,1,\ldots,Q-1, l=0,1,\ldots,Q-1$ $<u_i,v_i> = 0, i=0,1,\ldots,Q-1$ (E)

$<u_i,v_l> = -<v_i,u_l>, |i-l|$ odd $<u_i,v_l> = 0, |i-l|$ even

The first two conditions translate to unitarity of the matrices U and V. That is, $$UU^H U = U^H U = I_Q$$

$$VV^H U = V^H V = I_Q$$

The last three conditions can be satisfied by choosing U and V such that, $$U^H V = \begin{bmatrix} O_{Q/2} & J_{Q/2} \\ -J_{Q/2} & Q_{Q/2} \end{bmatrix}$$ (F)

where $J_{Q/2}$ is a permutation matrix of size Q/2 with ones on the main anti-diagonal and zeros everywhere else, and $O_{Q/2}$ is a zero matrix of size Q/2. A method for designing the linear transforms proceeds as follows. First select a unitary matrix G. Next, U can be set equal to G. Then we have, $$U = G \text{ and } V = G \begin{bmatrix} O_{Q/2} & J_{Q/2} \\ -J_{Q/2} & O_{Q/2} \end{bmatrix}$$ (G)

Thereby, the two unitary transform matrices have been determined. Examples of linear transform matrices that satisfy the above criteria include:

$$U = \frac{1}{\sqrt{2}} \begin{bmatrix} 1 & 1 \\ 1 & -1 \end{bmatrix} \qquad V = \frac{1}{\sqrt{2}} \begin{bmatrix} -1 & 1 \\ 1 & 1 \end{bmatrix}$$ (H)

for a block size Q of 2, or:

$$U = \frac{1}{2} \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad V = \frac{1}{2} \begin{bmatrix} -1 & -1 & 1 & 1 \\ 1 & -1 & -1 & 1 \\ 1 & 1 & 1 & 1 \\ -1 & 1 & -1 & 1 \end{bmatrix}$$ (I)

for a block size of Q=4.

The entries to the unitary transform matrices can be complex. Selection of the unitary matrices according to the submitted guidelines results in channel orthogonalization.

Diversity Receiver

Figure 6:
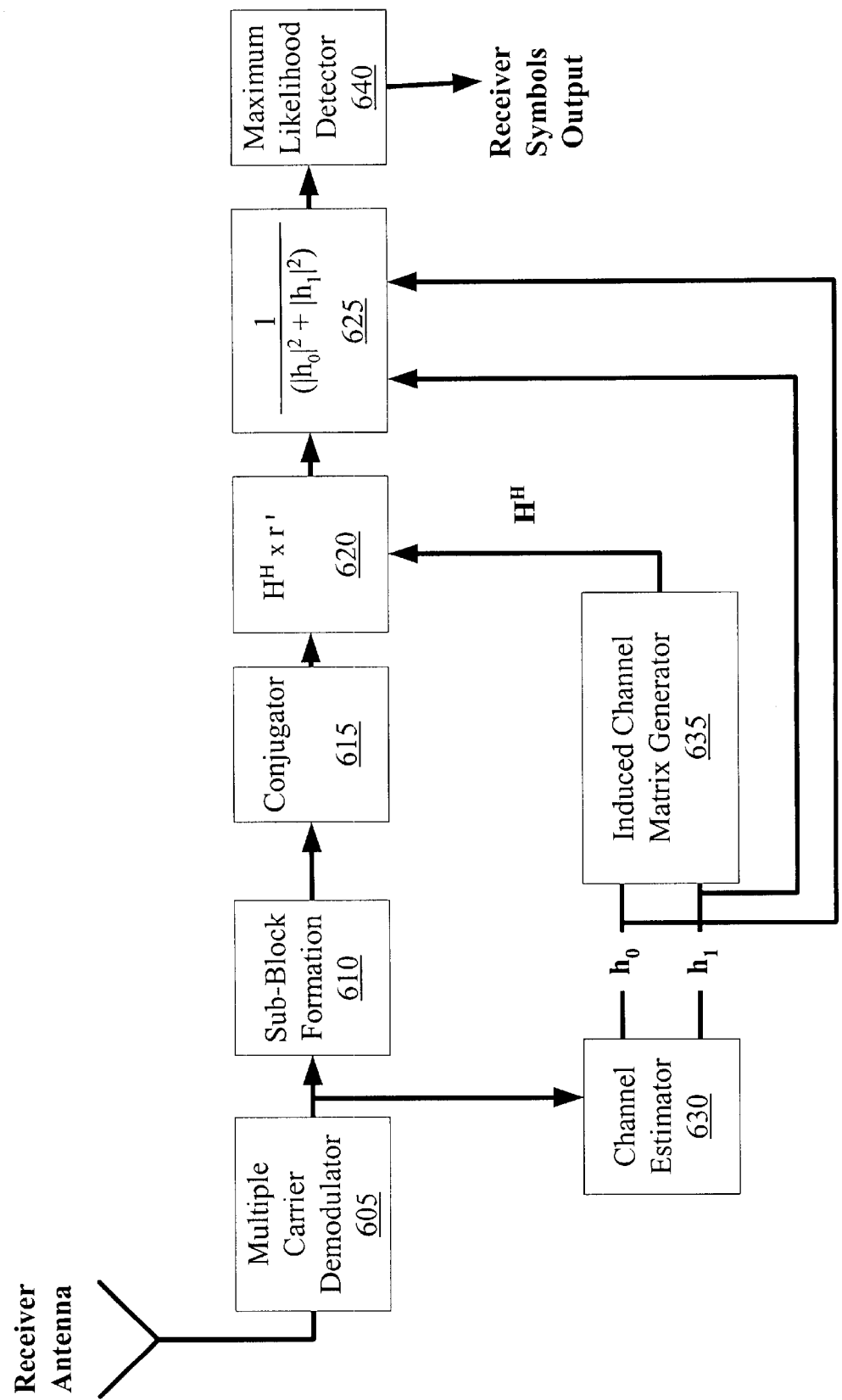
FIG. 6 shows an embodiment of a receiver according to the invention.

FIG. 6 shows an embodiment of a diversity receiver 270 according to the invention. The diversity receiver 270 of this embodiment includes a multiple-carrier signal demodulator 605, a sub-block former 610, a conjugator 615, a first processing unit 620, a second processing unit 625, a channel estimator 630, an induced channel matrix generator 635 and a first maximum likelihood (ML) detector 640.

As previously stated, the response at the receiver is r'=Hs. From this relationship, the following relationship can be established:

$$H^H r' = H^H H s$$

However, as previously stated:

$$H^H H = (|h_0|^2 + |h_1|^2) I_Q.$$

Therefore, $$H^H r' = (|h_0|^2 + |h_1|^2) s.$$

Solving for s yields;

$$s = (H^H r')/(|h_0|^2 + |h_1|^2)$$

The variables r' and $(|h_0|^2 + |h_1|^2)$ can be measured and estimated, respectively, by the diversity receiver. First, r is the response received by the receiver, and r' is obtained by conjugating every second entry in r, and can be determined from the output of the conjugator 615. The value of $(|h_0|^2 + |h_1|^2)$ can be determined by training the transmission system. That is, $h_0$ and $h_1$ can be determined by pre-sending a known sequence from the transmitter and observing the response at the receiver. The more often the channel response changes, the more often the training of the system must by performed. The induced channel matrix H can be determined by knowing the linear transform matrices of the transmitted symbols in the receiver, and the values of $h_0$ and $h_1$. Therefore, a value s can be determined for every received value r.

The receiver block diagram of FIG. 6 is essentially an implementation of the equation $s = (H^H r')/(|h_0|^2 + |h_1|^2)$ that solved for the symbol response s. The first processing unit 620 implements $H^H r$, and the second processing unit 625 implements $1/(|h_0|^2 + |h_1|^2)$.

The first maximum likelihood (ML) detector 640 determines which symbol from the set of possible symbols each of the received and processed symbol are most likely to be. The maximum likelihood detection includes computation of $2^b$ symbol states where b is the number of bits included with each transmitted symbol.

Figure 7:
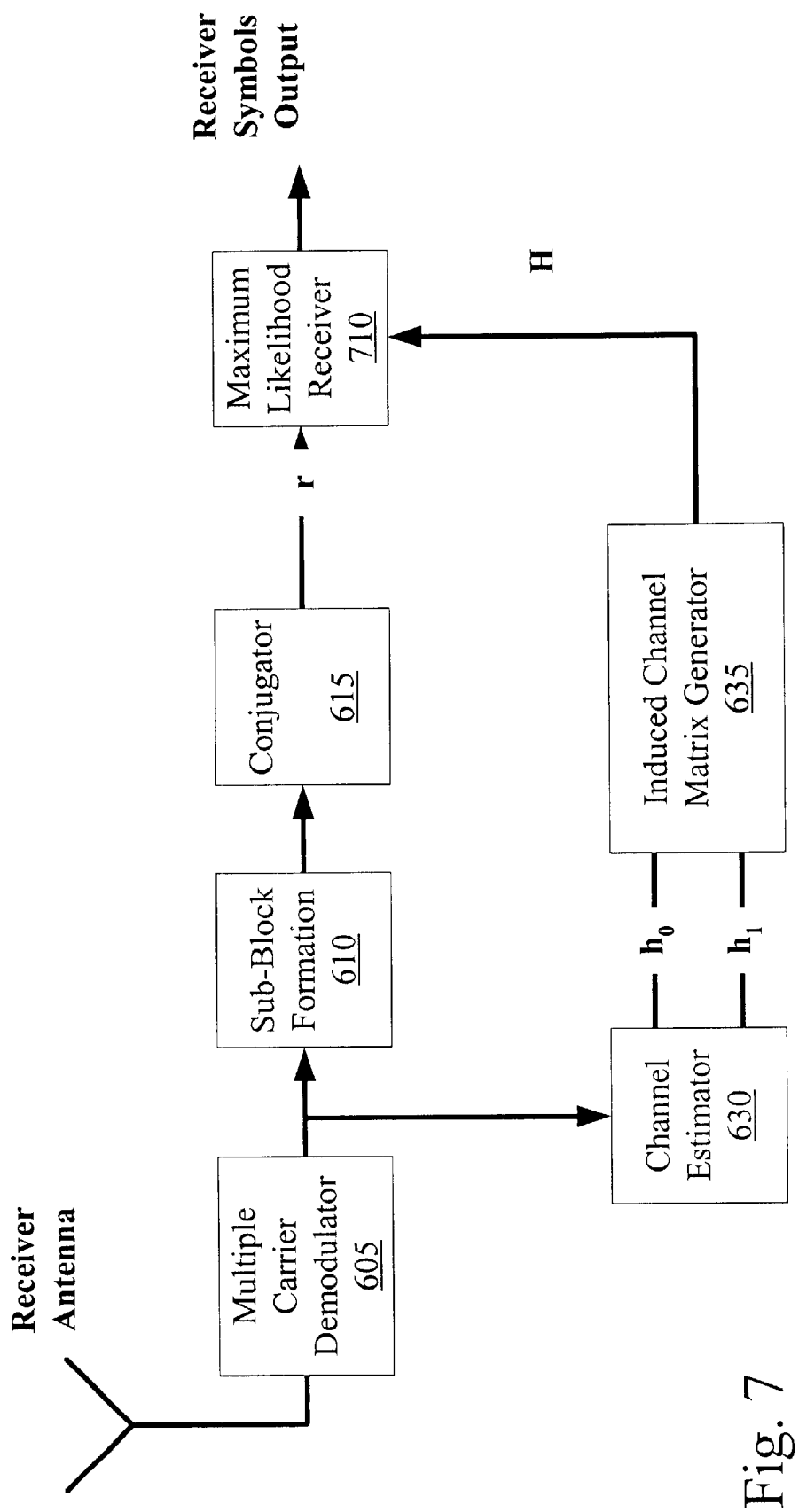
FIG. 7 shows another embodiment of a receiver according to the invention.

FIG. 7 shows another embodiment of a receiver according to the invention. The diversity receiver 270 of this embodiment includes a multiple-carrier modulated signal demodulator 605, a sub-block former 610, a conjugator 615, a channel estimator 630, an induced channel matrix generator 635 and a second maximum likelihood (ML) detector 710.

The channel analysis above included the assumption that the channel is constant over Q consecutive tones, where Q is the blocksize. In general, this condition may not be met unless the channel has minimal delay spread. Therefore, decoding as described above by left-multiplying by the conjugate transpose of the induced channel matrix may not be optimal.

If the delay spread is too great, another embodiment of the receiver as shown in FIG. 7 that includes direct maximum-likelihood decoding may be preferred over the embodiment of the receiver shown in FIG. 6. Here, the first processing unit 620, the second processing unit 625 and the first maximum likelihood (ML) detector 640 have been replaced by the second maximum likelihood (ML) detector 710.

Recalling the received vector r', the maximum likelihood receiver includes computation of:

$$\hat{s} = \underset{s \in S}{\operatorname{argmin}} \|r' - Hs\|^2 \quad \text{(J)}$$

In which the minimization is performed over all possible transmit vectors. The number of possible transmit vectors is dependent on the symbol format (4 QAM, 16 QAM etc.) and the number of transmit antennas.

Employing M-ary modulation with $M=2^b$ where b is the number of bits transmitted per symbol, we have $|S|=2^{bQ}$. That is, the minimization must be performed over $2^{bQ}$ possible transmit vectors. For higher-order modulation and a large blocksize, the computation of this embodiment can become more complex. However, with low-order modulation and small block sizes, this embodiment is practically feasible. Significant performance gains can be expected in large delay spread channels.

Performance Comparison

Figure 8A:
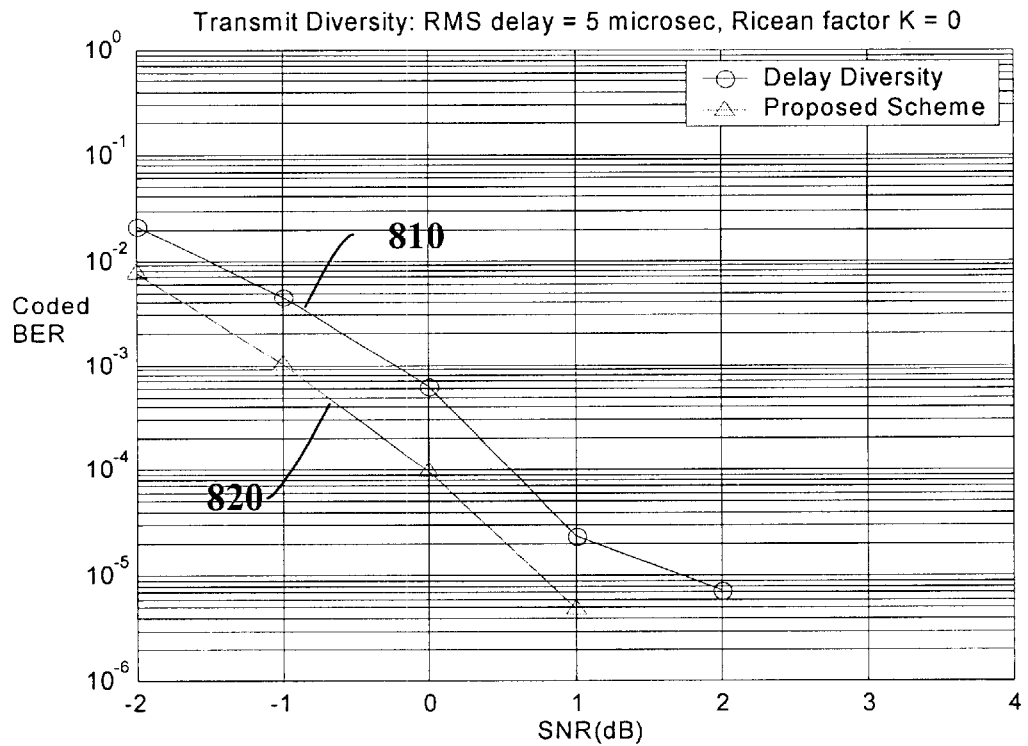
FIGS. 8A and 8B are plots that show comparisons between the bit error rate (BER) performance of the invention versus another common transmitter diversity scheme.
Figure 8B:
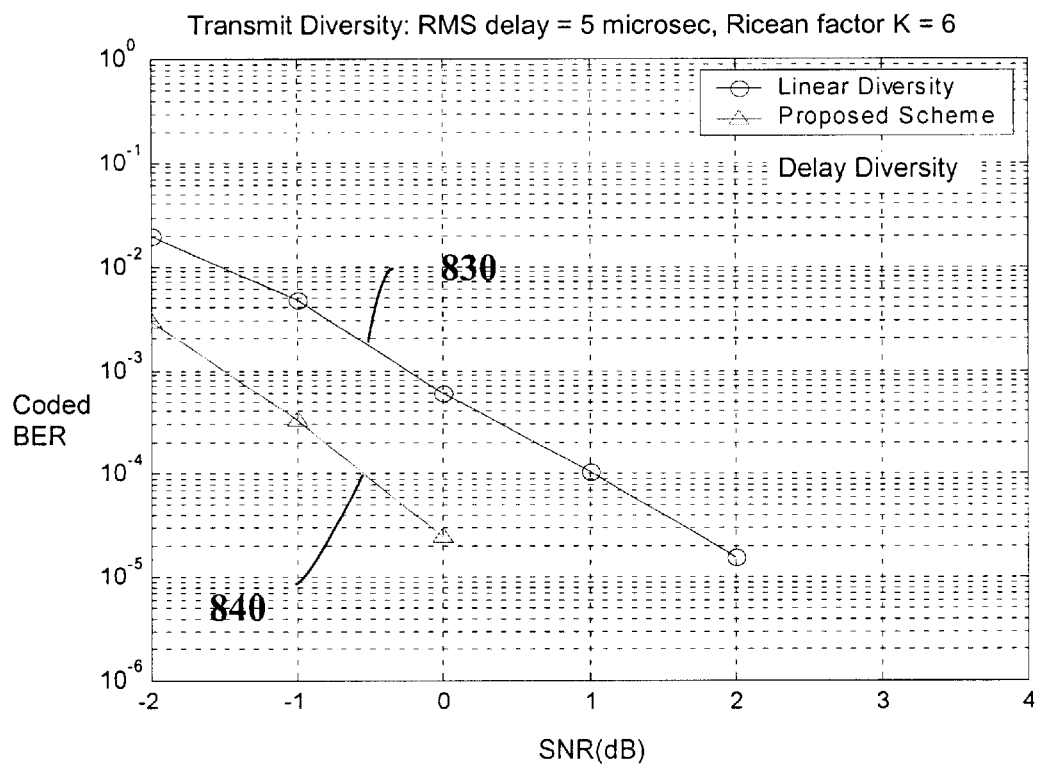

FIGS. 8A and 8B are plots that show comparisons between the bit error rate (BER) performance of the invention versus another common transmitter diversity scheme. For the simulation, the following parameters were used:

Block size Q=4,

OFDM modulation, with 4-QAM sub-symbols on each orthogonal sub-carrier, coding=rate ½, with soft decoding, two transmit antennas and three receiver antennas, the channel was modeled with an RMS delay spread=5 microseconds, FIG. 8A includes Ricean factor K=0, and FIG. 8B includes a Ricean factor of 6.

Here, the proposed scheme is compared with delay diversity. In both of the cases, the decoded symbols from the three receive branches are combined using a maximum ratio combining (MRC).

FIG. 8A shows that with a Ricean factor of K=0, the delay diversity scheme (curve 810) requires a −0.25 dB SNR to achieve a BER of $10^{-3}$, whereas the diversity scheme (curve 820) of the invention only requires an SNR of −1 dB to achieve a BER of $10^{-3}$. Hence, there is a 0.75 dB reduction in the required SNR with diversity scheme of the invention. FIG. 8B shows that with a Ricean factor of K=6, the delay diversity scheme (curve 830) requires −0.25 dB SNR to achieve a BER $10^{-3}$, whereas the diversity scheme (curve 840) of the invention only requires a −1.5 dB SNR to achieve a BER of $10^{-3}$. Hence, there is a 1.25 dB reduction in the required SNR with the diversity scheme of the invention.

Although specific embodiments of the invention have been described and illustrated, the invention is not to be limited to the specific forms or arrangements of parts so described and illustrated. The invention is limited only by the claims.

What is claimed:

1. A diversity transmitter comprising:

a symbol processing unit for receiving a stream of incoming symbols and generating a plurality of processed symbol streams, each processed symbol stream comprising a stream of processed symbols, each processed symbol comprising a linear combination of a plurality of incoming symbols, each processed streams being generated by multiplying blocks of the incoming symbols with pre-stored linear transform matrices; wherein the pre-stored linear transform matrices include N rows and Q columns, wherein N is greater than Q; and a plurality of multi-carrier modulators generating a plurality of multiple-carrier modulated signals, each multi-carrier modulator receiving a corresponding processed symbol stream and generating a multiple-carrier modulated signal based on the corresponding processed symbol stream.

2. A diversity transmitter comprising:

a symbol processing unit for receiving a stream of incoming symbols and generating a plurality of processed symbol streams, each processed symbol stream comprising a stream of processed symbols, each processed symbol comprising a linear combination of a plurality of incoming symbols, each processed streams being generated by multiplying blocks of the incoming symbols with pre-stored linear transform matrices; wherein the pre-stored linear transform matrices comprise unitary transform matrices; and a plurality of multi-carrier modulators generating a plurality of multiple-carrier modulated signals, each multi-carrier modulator receiving a corresponding processed symbol stream and generating a multiple-canier modulated signal based on the corresponding processed symbol stream.

3. A diversity transmitter comprising:

a symbol processing unit for receiving a stream of incoming symbols and generating a plurality of processed symbol streams, each processed symbol stream comprising a stream of processed symbols, each processed symbol comprising a linear combination of a plurality of incoming symbols; and a plurality of multi-carrier modulators generating a plurality of multiple-carrier modulated signals, each multi-carrier modulator receiving a corresponding processed symbol stream and generating a multiple-carrier modulated signal based on the corresponding processed symbol stream;

wherein the symbol processing unit comprises:

a sub-block unit that receives the incoming symbols and generates symbol sub-blocks;

a database of a plurality of linear transform matrices;

a processing sub-unit that receives the symbol sub-blocks and the linear transform matrices and generates a plurality of symbol sub-block streams based upon the linear transform matrices by multiplying the symbol sub-blocks with corresponding linear transform matrices; and a plurality of conjugators that receive a corresponding symbol sub-block stream and conjugating every second entry of the symbol sub-block stream, generating the processed symbol sub-block streams.

4. A diversity transmitter comprising:

a symbol processing means for receiving a stream of incoming symbols and generating a plurality of processed symbol streams, each processed symbol stream comprising a stream of processed symbols, each processed symbol comprising a linear combination of a plurality of incoming symbols, the processed symbol streams being generated by multiplying blocks of the incoming symbols with pre-stored linear transform matrices; wherein the incoming symbols are grouped into Q×1 sub-blocks and the pre-stored linear transform matrices include N rows and Q columns, wherein N is greater than Q; and a plurality of multi-carrier modulators generating a plurality of multiple-carrier modulated signals, each multi-carrier modulator receiving a corresponding processed symbol stream and generating a multiple-carrier modulated signal based on the corresponding processed symbol sub-block stream.

* * * * *